United States Patent [19]

Laganis et al.

[11] 4,133,787

[45] Jan. 9, 1979

[54] WATER SOLUBLE POLYESTER RESIN

[75] Inventors: Deno Laganis, Schenectady; Paul M. Begley, Scotia, both of N.Y.

[73] Assignee: Schenectady Chemicals, Inc., Schenectady, N.Y.

[21] Appl. No.: 874,516

[22] Filed: Feb. 2, 1978

Related U.S. Application Data

[62] Division of Ser. No. 795,907, May 11, 1977, Pat. No. 4,105,639.

[51] Int. Cl.$^2$ .............................................. C08L 67/02
[52] U.S. Cl. ...................... 260/29.2 E; 260/29.2 TN; 260/29.2 N; 428/458
[58] Field of Search ................. 260/29.2 N, 29.2 TN, 260/29.2 E; 428/458

[56] References Cited

U.S. PATENT DOCUMENTS

| | | | |
|---|---|---|---|
| 3,053,782 | 9/1962 | Shelby ............................. | 260/29.2 N |
| 3,053,783 | 9/1962 | Broadhead et al. ............ | 260/29.2 N |
| 3,115,476 | 12/1963 | Agens et al. ..................... | 260/29.2 N |
| 3,458,480 | 7/1969 | Schmidt et al. ................... | 260/75 N |
| 3,766,119 | 10/1973 | Snapp et al. ..................... | 260/29.2 N |
| 3,931,418 | 1/1976 | Risken ............................. | 260/75 R X |
| 4,066,593 | 1/1978 | Czajka et al. ................... | 260/29.2 E |

*Primary Examiner*—Lucille M. Phynes
*Attorney, Agent, or Firm*—Cushman, Darby & Cushman

[57] ABSTRACT

Water soluble polyesters are prepared by reacting an aromatic dicarboxylic acid, a diol and a triol (the molar ratio of diol to triol being 75:25 to 40:60) with or without a monohydric alcohol. The polyesters have a molecular weight of 800 to 1300, an OH/COOH ratio of 1.8:1 to 3:1. The polyesters are useful in making wire enamels.

36 Claims, No Drawings

WATER SOLUBLE POLYESTER RESIN

This is a division, of application Ser. No. 795,907 filed May 11, 1977, now U.S. Pat. No. 4,105,639.

BACKGROUND OF THE INVENTION

The present invention relates to a water soluble polyester suitable for use as a wire enamel or other type of protective coating. In recent years EPA and OSHA have become more insistent and stringent in their regulations concerning solvents and chemicals relative to their photochemical reactivity, toxicity and related health hazards. This has acted as an impetus toward the development of newer polymers that are capable of being solubilized in water that meet these new Federal and State regulations.

Another object is to prepare a non-trimellitic anhydride polyester with improved cut-through and heat shock properties as a wire enamel with a Class F or higher thermal rating.

A preview of prior art in this area is in order to better develop significant differences and features of the present invention over other polymer systems.

To better illustrate significant differences of the present invention over prior art one must consider the type of triol and diol, the critical ratio of these two materials, and the required excess hydroxyl content or the OH/COOH ratio. First of all, the present invention differs from the Laganis Patents U.S. Pat. Nos. 3,974,115 and 4,016,330 on at least five counts. One is that the polyester intermediate of the invention does not contain a tribasic carboxylic acid or more highly functional polycarboxylic aromatic acid to act as a solubilizing site to render it water soluble. Secondly, these polyesters are reacted to a relatively low acid number on the solids of 5-20 vs. an acid number ranging from 50 to 100 on a solids basis for the two cited patents. Thirdly, the range of excess hydroxyl groups is much higher for these new polyesters and ranges from 80 to 200% vs. 20 to 35% for the cited patents. Fourthly, the ratio of diol to triol is critical and no mention is made of this in the cited patents. Fifthly, and lastly, the new wire coating does not employ hydroxymethylated diacetone acrylamide as a crosslinking agent as in the cited patents.

Relative to Meyer-Zalewski patent U.S. Pat. No. 3,342,780, the present invention differs in at least three instances. Firstly, it differs in the OH/COOH ratio wherein the current invention has a minimum ratio starting from 1.8/1 up to a maximum of 3/1 compared to that of the cited patent of 1/1 up to a maximum of 1.6/1. Examples later on will demonstrate that a clear aqueous solution having less than 30% cosolvent cannot be obtained with less than 80% excess OH content. Secondly, there is the critical ratio of diol to triol to achieve water solubility. Thirdly, there cannot be used Tyzor TPT (tetra isopropyl titanate) as it is unstable in water, and there must be used a water soluble titanate such as the triethanol chelate of titanium or the ammonium lactate chelate of titanium to get a suitable wire coating.

There are many differences that distinguish the invention from the Chang patent U.S. Pat. No. 3,959,201, as to the polyester composition and the final blend. In Chang there are only two compositions shown in examples 77 and 102 that use an aromatic dicarboxylic acid, such as isophthalic acid, and none with terephthalic acid. Both of these examples chemically and molar-ratiowise are exactly identical, are linear in nature, and do not have a triol or any other polyhydric alcohol. Also these materials are blended with aminoplasts to cure, whereas the present compositions are not and have a much higher order of thermal stability and usage than that cited in this reference.

In Holzrichter U.S. Pat. No. 3,957,709, great emphasis is placed on the ester intermediate having a hydroxyl functionality of about 3, whereas in the present invention it ranges from 2.0 to 2.2. Further, the present polyesters have a molecular weight range of 800-1300 or 50 to 100% higher than those of Holzrichter and consequently, the polyesters of Holzrichter without a modifying alcohol do need the presence of a cosolvent as their water solubility and dilutibility are limited without it. From a thermal rating and wire properties in general it is absolutely essential to have a triol present. If one calculates the carbon to oxygen ratio (C/O) of THEIC which is 9/6 pr 4.5/3, then it falls outside the scope of this patent on the low end. It may also be noted that the hydantoin glycol, 1,3-hydroxyethyl-5,5 dimethyl hydantoin has a C/O of 9/4 or 6.75/3 and it is at the upper end of Holzrichter's range of about 7/3 which the patent says adversely affects the water solubility of the ester intermediate. This has not been found to be the case with the present polymers. Lastly, and also important, Holzrichter states in claims 1, 6, 7, 8 and 9 the need for an aminoplast and epoxy resin as curatives. Neither is present in the products of the invention as both would be detrimental on long-term thermal aging. The titanate is the only curing agent present in the present aqueous system and in the solvent system there is employed a phenolic and isocyanate intermediate, besides a titanate, as crosslinkers.

Preston U.S. Pat. No. 3,835,121 cites polyesters containing hydantoin radicals and isocyanurate radicals in the polymeric backbone, but no mention is made of the required excess hydroxyl content or its aqueous solubility characteristics in any of its claims. Furthermore, no mention is made of a monohydric alcohol, such as a glycol ether, which is an essential reactant in one alternative in the present invention. The extreme importance of the role that excess hydroxyl content plays in achieving aqueous solubility will be elaborated upon more fully below. Reviewing the six examples of Preston the excess hydroxyl content ranges from a low of approximately 17 to a high of approximately 63%. This is far below the minimum of 80% in the present case where THEIC only is present or where the hydantoin glycol is present alone with a triol other than THEIC. In both instances with a composition of this type a certain amount of cosolvent, namely, in the 10-30% range, is required. With the monohydric alcohol modified composition no cosolvent is necessary. Furthermore, a different titanate is needed, namely, Tyzor TE or other water soluble titanate for the present invention whereas the Preston titanate is not water soluble or stable in the presence of water. In general, the present solvent system is totally different from Preston's, and thus requires significant formulation changes to achieve a desirable and reasonably economical wire enamel system.

The present polyester composition differs from Hosokawa U.S. Pat. No. 4,011,185, in that it contains no aromatic tetracarboxylic acid or anhydride as required in Hosokawa's claims 1, 4 and 10. Furthermore, in the present invention reaction is carried out to an acid number range of 2-20 vs. 70 to 140 and 70 to 100 as cited in claims 14 and 15 of Hosokawa. The needed wire properties would not be obtained at these high acid numbers because of too many oligomers being present at the higher acid values or less reacted polymers. The organic amines used in this patent are not used solely as solubilizing agents, but react with the free carboxyl groups in the polymer to form amides which further distinguishes the present invention from it as applicant employs only tertiary amines as solubilizing agents and as cosolvents since they are amine alcohols. The product of this patent is thus a polyester-amide and not a straight polyester.

SUMMARY OF THE INVENTION

It is an object of the present invention to provide a novel insulating coating that is completely soluble in water alone or a mixture of water and cosolvent.

Another object is to provide improved aqueous polyester coatings for electrical conductors.

A further object is to provide wire enamels which exhibit good electrical and mechanical properties coupled with good thermal capabilities.

An additional object of the present invention is to prepare new water soluble polyesters.

The other objects and advantages of the present invention will become apparent from the following description.

During the development of the polyester intermediates that were readily soluble in water, it became evident that two important factors were operative. One was that the type of polyol was a key to greatly improved solubility in water. The other parameter was the excess hydroxyl content, and its critical range. As to the solubility of these polyesters they were either soluble in water alone or in a water cosolvent content of 70/30 by weight at the most.

To get the best values in terms of cut-throughs, heat shocks and other mechanical and electrical properties, along with a high thermal rating of Class F or higher, efforts were focused on a terephthalate-based polyester which contained various diols, triols and other adjuvants.

There are two types of polyesters within the invention:

(1) A polyester that is completely soluble in water only may be obtained by reacting (1) an aromatic dicarboxylic acid or derivative thereof with (2) THEIC or an aliphatic polyhydric alcohol having at least three hydroxyl groups (3) a primary diol and (4) a monohydric alcohol; and, (2) A polyester that is completely soluble in a water/-polar solvent or cosolvent in a weight ratio of 95/5 to 70/30, respectively and is obtained by reacting (1) an aromatic dicarboxylic acid or a derivative thereof with (2) THEIC or an aliphatic polyhydric alcohol having at least three hydroxyl groups and (3) a primary diol.

The term "aqueous" as referred here is meant to define a clear, stable aqueous solution with little or no opalescence thereto, and not to an emulsion, suspension or aqueous dispersion. In the formulation of these polyesters familiar terms such as equivalents, moles, and excess hydroxyl content calculated from the total hydroxyl equivalents divided by the total carboxyl equivalents, or more simply by the expression of OH/COOH ratio, are referred to frequently.

The critical ratio of triol to diol on a molar basis shall be referred to frequently in pointing out its importance in achieving aqueous solubility concomitant with good wire properties. The critical molar ratio of diol/-triol may range from 75/25 to 40/60, respectively. With respect to the critical content of the monohydric alcohol necessary to achieve complete aqueous solubility without any cosolvent present it may range from 2 to 25 equivalent percent of the total diol equivalents present.

The polyester intermediates of this invention may be characterized as reaction products of aromatic dicarboxylic acids and hydroxyl-bearing compounds having one or more hydroxyl groups per mole of reactants. Furthermore, the water solubility and further dilutibility with water will vary somewhat with the particular constituents so that small amounts of cosolvent may be necessary to achieve a clear, aqueous solution. The polyesters are polymeric in nature, and having molecular weights ranging in value from 800 to 1300. This provides a favorably high solids wire enamel ranging from 45 to 75% solids along with a low acid number to minimize water sensitivity of the baked film on wire. The acid number of the polyesters of the invention is usually quite low, e.g., 2-20, usually 5-20 when using THEIC.

The polyesters are condensation products produced by esterifying aromatic dicarboxylic acids with polyols at a OH/COOH ratio of 1.8/1 to 3/1. The polyol may be a trihydric alcohol, such as tris(2-hydroxyethyl-)isocyanurate (hereinafter referred to as THEIC), and used in combination with a primary diol, such as ethylene glycol or 1,3-dihydroxyethyl, 5,5-dimethyl hydantoin (hereinafter referred to as DHEDMH).

In another form of the invention a polyol in combination with a diol and a monohydric alcohol is used to achieve complete solubility in water alone with the resultant polyester. The monohydric alcohol, such as glycol ether, was substituted for ethylene glycol on an equivalent basis and at a range of 2 to 25 equivalent percent the polyester would stay clear as an aqueous solution with 20% or less of cosolvent. At the 10 and 20 eq. % of monohydric alcohol no cosolvent was required and the best wire properties were obtained.

The principal reactants in the preparation of one class of polyesters are:
  aromatic dicarboxylic acids
  diols
  triols or higher polyols
  monohydric alcohols For the other class of polyesters it employs the same reactants as above, except for the absence of monohydric alcohols. As the dicarboxylic acid, one or more aromatic dicarboxylic acids (including anhydrides of such acids) or a combination of aromatic with a cycloaliphatic acid (or anhydride thereof) may be employed. Also, the dimethyl or diethyl esters or chlorides thereof may also be used.

CARBOXYLIC ACIDS AND DERIVATIVES a. Aromatic-terephthalic acid, isophthalic acid, phthalic anhydride, phthalic acid, benzophenone-4,4'-dicarboxylic acid, naphthalene-1,4-dicarboxylic acid, naphthalene-1,5-dicarboxylic acid, 4,4'-dicarboxydiphenyl sulfide, 4,4'-dicarboxydiphenyl sulfone, 3,3'-dicarboxydiphenyl sulfone, 4,4'-dicarboxydiphenyl ether, 4,4'-dicarboxdiphenyl methane, 4,4'-dicarboxydiphenyl ketone, 4,4'-dicarboxydiphenyl propane and the corresponding di lower alkyl esters and acid chlorides.

b. Cycloaliphatic-tetrahydrophthalic anhydride, hexa hydrophthalic anhydride, 1,4-cyclohexane dicarboxylic acid, 3,6-endo-methylene-4-tetrahydrophthalic anhydride as well as the corresponding free acids. The cycloaliphatic dicarboxylic acid (or anhydride, acid chloride or di lower alkyl ester) can be present in an amount of 0 to 50%, e.g., 1 to 50% of the total equivalents of acid component, the balance being the aromatic dicarboxylic acid or derivative.

One or more dihydric alcohols may be used in combination with triols or higher polyhydric alcohols and with or without monohydric alcohols of the glycol ether type, benzyl alcohol type, or tertiary amino alcohols.

Diols — ethylene glycol, propylene glycol, 1,3-butylene glycol, neopentyl glycol, 1,3-di(hydroxyethyl)-5,5-dimethyl hydantoin, 1,5-pentanediol, 1,6-hexanediol, 1,4-cyclohexanedimethanol, 1,4-cyclohexanediol, diethylene glycol, dipropylene glycol, Union Carbide's "Ester Diol 204", Dow's 565, dipropylene glycol, 4,4'-di(hydroxymethyl)diphenyl methane.

Triols — trishydroxyethyl isocyanurate (THEIC), glycerine, trimethylolethane, trimethylolpropane, 1,2,5-hexanetriol, polyether triol (avg. mol. wt. 268 ethoxylated glycerine), etc.

Higher polyols — mono-, di- and tri-pentaerythritol, Monsanto's RJ-100 (styrene-allyl alcohol copolymer with avg. mol. wt. 1600), etc.

Monohydric alcohols — glycol ethers, such as methoxy diethanol, ethoxy diethanol, butoxy diethanol, methoxy ethanol, ethoxy ethanol, butoxy ethanol, phenoxy ethanol, phenoxy propanol, phenoxy propoxy propanol, phenoxy diethanol, phenoxy tetraethanol, etc. Other alcohols are benzyl alcohol, hydrogenated abietic acid or abietyl alcohol. Tertiary amino mono alcohols, such as N,N-dimethylamino ethanol, N,N'-phenyl ethyl ethanolamine, N,N'-diethyl amino ethanol, N,N'-dibutyl amino ethanol, etc.

The preferred reactants are terephthalic acid (or dimethyl terephthalate, THEIC and ethylene glycol). If a monohydric alcohol is present it is preferably a lower alkoxyethanol, a lower alkoxyethoxyethanol, phenoxyethanol or phenoxyethoxyethanol.

As the dicarboxylic acid reactant there can be employed one or more free aromatic dicarboxylic acid, the anhydrides of such acids, e.g., phthalic anhydride, the lower alkyl esters of such acids, e.g., dimethyl terephthalate, diethyl terephthalate, dibutyl terephthalate and dimethyl isophthalate or the acid chloride, e.g., terephthaloyl chloride. As used in the claims when there is recited the reaction product of an "acid" is used this is intended to cover the free acid, the anhydride (if it exists), the lower alkyl ester and the acid chloride, If the term "acid" in the claims is limited to the free acid then the word "free" will precede "acid". In the specification, however, the term "acid" means the "free acid" unless another meaning is clear from the context.

In the preparation of the polyester, the proportions of the alcohols to the acids have been calculated on equivalents of hydroxyl (OH) and carboxyl (COOH) groups. The proportions of each type of reactive groups are critical. The proportions may be expressed in a ratio, such as OH/COOH, or as a percentage of excess OH groups over the total of COOH groups. The OH/COOH ratio may range from 1.8/1 to 3/1 or an excess % OH from 80 to 200. The preferred excess hydroxyl content may range from 80 to 150%.

The preferred triol is THEIC, a nitrogen and carbonyl containing polyol, and when used alone or as the predominant one in admixture with other triols, the critical molar ratio of diol/triol may range from 75/25 to 40/60, respectively.

It has also been discovered that another nitrogen and carbonyl-containing hydantoin diol, such as 1,3-hydroxyethyl-5,5-dimethyl hydantoin yields clear, aqueous solutions at cosolvent levels of 30% or less when combined with glycerine as a polyol. Hitherto clear aqueous solutions had been obtained only when THEIC was present as a polyol in combination with ethylene glycol or other diols. Now, unexpectedly, hydantoin glycol alone or in combination with other diols may be used with polyols other than THEIC to get equally good solubility. Obviously, combinations of hydantoin glycol and THEIC may be utilized as well to get the desired aqueous solubility. Again the molar diol/triol ratio may range from 75/25 to 40/60, respectively.

The use of water soluble titanates is critical when blended with the polyesters of the invention to make wire enamels not only to obtain good mechanical and electrical properties as a wire coating, but also to get low dissipation factors.

The polyester wire enamel is modified by the incorporation of 1-10% of organic titanate, such as titanate chelates or salts, on the total solids of the enamel. The addition of an adjuvant of this type enhances the thermoplastic flow properties of the enamel and provides lower dissipation factors. Typical examples of suitable titanates include the triethanolamine chelate of titanium, known as Tyzor TE (Du Pont Trademark), and the ammonium lactate salt of titanium, known as Tyzor LA (Du Pont Trademark). These titanates and any others that are hydrolytically stable, e.g., titanium acetyl acetate, may be used as crosslinking agents. The amount of titanate used may be 1-10% of the total enamel solids, and preferably 2-6%.

To solubilize these inherently water-insoluble resinous prepolymers in water various amines may be employed that react with the free carboxyl groups available to form the salts that are soluble in water. These amines may be of the alkyl, alkanolamine, or morpholine types. In general, the tertiary amines work best from the standpoint of fast cure, and confer the least moisture sensitivity in the resultant baked film.

Thus, there can be used trialkyl amines, N-alkyldiethanolamine, N,N-dialkyl alkanolamines, N-alkyl morpholine, N-hydroxyalkyl morpholine, etc. The alkyl group is usually lower alkyl, e.g., of 1 to 4 carbon atoms.

Typical examples of tertiary amines are:
triethyl amine, trimethyl amine, tributyl amine, triethanolamine
N,N-dimethyl ethanolamine (a preferred tertiary amine)
N,N-diethyl ethanolamine
N,N-diisopropyl ethanolamine
N,N-dibutyl ethanolamine
triisopropanolamine
N,N-dibutyl isopropanolamine
N-methyl diethanolamine (a preferred tertiary amine)
N-ethyl diethanolamine, N-propyl diethanolamine
N-methyl morpholine
N-ethyl morpholine
N-(2-hydroxyethyl)morpholine
2-amino-2-methyl 1-propanol
2-dimethylamino-2-methyl 1-propanol A sufficient quantity of amine is employed to raise the pH of the aqueous solution to a range of 7-9 and preferably 7.5-8.5.

The incorporation of a polar solvent, as a minor component of a water/cosolvent blend, enhances the solubility of those polyesters which may not be soluble in water alone. Furthermore, the polar solvent enhances the flow during cure of the enamel and ultimately the smoothness and concentricity of the resultant baked film.

Typical polar solvents that may be incorporated are principally water-miscible. They include:
N-methyl pyrrolidone
butyrolactone
dimethyl sulfoxide
diacetone alcohol
dioxane
glycol ethers, e.g., methoxyethanol, ethoxyethanol, butoxyethanol, diethylene glycol monomethyl ether, diethylene glycol monoethyl ether and the other alkoxyalkanols and alkoxyalkoxyethanols mentioned above as monohydric alcohols
alcohols, e.g., ethyl alcohol, isopropyl alcohol, methyl alcohol, glycols such as ethylene glycol, diethylene glycol, triethylene glycol, trimethylene glycol, propylene glycol, dipropylene glycol
ketones, e.g., acetone, methyl ethyl ketone
glycol ether acetates, e.g., methoxyethyl acetate, ethoxyethylacetate, butoxyethyl acetate
glycol diethers, e.g., diethylene glycol dimethyl ether, diethylene glycol diethyl ether The amount of cosolvent incorporated along with water may range from 0–30% of the total blend, e.g., 5 to 30%, and preferably 10–25%.

The polyester consists of or consists essentially of the stated dibasic acid, trihydric alcohol, dihydric alcohol plus or minus the monohydric alcohol. The wire enamel also consists essentially of the polyester dissolved in the solvent. There can be added conventional phenol-formaldehyde resins and polyurethanes, if desired.

The wire enamels can be applied to copper, silver and other metal conductors.

DESCRIPTION OF THE PREFERRED EMBODIMENTS

Examples 1–18 disclose the method for making the polyester component of the composition.

EXAMPLE 1 a. Preparation of Polymer

|  | Reactants | Wt. Grams | Mols | Equivalents |
|---|---|---|---|---|
| (A) | Ethylene Glycol | 395 | 6.37 | 12.74 |
| (B) | THEIC | 1438 | 5.51 | 16.53 |
| (C) | Terephthalic Acid | 1328 | 8.00 | 16.00 |
|  | OH/COOH = 1.83/1 | | | |

Materials A, B and C were charged into a 5 liter, three-neck flask equipped with agitator, thermometers for flask and distilling head, 3-bubblecap Snyder fractionating column and water-cooled condenser.

Heat was applied and the batch temperature was gradually increased to 400°–420° F. in approximately 4 hours. More importantly the distilling head temperature was controlled at 200°–212° F. to keep glycol losses down to 2% or less. The batch was maintained at the top temperature range of 400°–420° F. until the melt was clear hot and the total distillate collected at this point was 250 mls. It was then checked for viscosity and acid number, and the following results were obtained:

Viscosity: Q ½ measured at 30% solids in cresylic acid No. 43
Acid No.: 9 on solids The base was discharged into a metal container and allowed to solidify.

b. Preparation of Aqueous Wire Enamel

The hard resin was broken into large pieces, and an aqueous enamel was prepared with it as follows:

|  | Wt. Grams | Letter |
|---|---|---|
| Polyester of Example 1 | 1200 | A |
| N-Methyl Pyrrolidone (NMP) | 120 | B |
| Dimethyl Ethanolamine (DMEA) | 120 | C |
| Distilled Water | 560 | D |
| NMP | 20 | E |
| Triethanolamine Chelate of Titanium (80% in isopropanol)* | 75 | F |

*hereinafter referred to as Tyzor TE (Du Pont)

Materials A and B were charged into a 3-liter, 3-neck round bottom flask, and heated to 290°–300° F. until the polymer was fluid and dissolved. The contents were then cooled to 250° F., and material "C" was added carefully. Materials "D" and "E" were added, and allowed to mix until a homogeneous solution resulted. The solution was allowed to cool to 110° F. and material "F" was added, and stirred in thoroughly. The liquid properties of the aqueous enamel were:

Viscosity: X ¾
pH: 7–8
% Solids: 60.1
% Cosolvent: 20

EXAMPLE 2 a. Preparation of Polymer

|  | Reactants | Wt. Grams | Mols | Equivalents |
|---|---|---|---|---|
| (A) | Ethylene Glycol | 576 | 9.29 | 18.58 |
| (B) | THEIC | 1148 | 4.40 | 13.20 |
| (C) | Terephthalic Acid | 1328 | 8.00 | 16.00 |
|  | OH/COOH = 2/1 | | | |

The same equipment and procedure as outlined in Example 1(a) were employed in preparing this polymer. It was controlled to a final viscosity of J-L measured at 30% solids in cresylic acid, and then discharged into a pan to solidify.

b. Preparation of Aqueous Wire Enamel

Using the same equipment and procedure as described in Example 1(b) an aqueous enamel was prepared by blending 500 grams of base polymer 2(a) with 50 grams NMP, 50 grams DMEA, 200 grams distilled water, and 18.8 grams Tyzor TE. Its liquid properties were:

Viscosity: V
% Solids: 62.9
pH: 7–8
% Cosolvent: 20

EXAMPLE 3 a. Preparation of Polymer

|  | Reactants | Wt. Grams | Mols | Equivalents |
|---|---|---|---|---|
| (A) | Ethylene Glycol | 474 | 7.645 | 15.29 |
| (B) | THEIC | 1726 | 6.613 | 19.84 |
| (C) | Terephthalic Acid | 1394 | 8.400 | 16.80 |
|  | OH/COOH = 2.09/1 | | | |

The same equipment and procedure as outlined in Example 1(a) were employed in preparing this polymer.

It was reacted to a final viscosity of O-P measured at 30% solids in cresylic acid, and discharged into a pan to solidify.

b. Preparation of Aqueous Wire Enamel

Using the same equipment and procedure as described in Example 1(b) an aqueous enamel was compounded by blending 1390 grams of base polymer 3(a) with 139 grams NMP, 139 grams DMEA and 556 grams distilled water with the following liquid characteristics:

Viscosity: W
pH: 7-8
% Solids: 62.5
% Cosolvent: 20

EXAMPLE 4 a. Preparation of Polymer

|   | Reactants | Wt. Grams | Mols | Equivalents |
|---|---|---|---|---|
| (A) | Ethylene Glycol | 474 | 7.645 | 15.29 |
| (B) | THEIC | 1726 | 6.613 | 19.84 |
| (C) | Terephthalic Acid | 1195 | 7.200 | 14.40 |
|   | OH/COOH = 2.40/1 | | | |

The same equipment and procedure as outlined in Example 1(a) were employed in preparing this polymer. It was reacted to a final viscosity of M ½ measured at 30% solids in cresylic acid and then dropped into a pan to harden.

b. Preparation of Aqueoue Wire Enamel

Using the same equipment and procedure as described in Example 1(b) an aqueous enamel was prepared by blending 700 grams of base polymer 4(a) with 60 grams NMP, 70 grams DMEA, 240 grams distilled water, and 43.75 grams Tyzor TE with liquid properties as follows:

Viscosity: T
% Solids: 66
pH: 7-8
% Cosolvent: 20

EXAMPLE 5 a. Preparation of Polymer

|   | Reactants | Wt. Grams | Mols | Equivalents |
|---|---|---|---|---|
| (A) | Ethylene Glycol | 434 | 7.000 | 14.00 |
| (B) | THEIC | 1131 | 4.333 | 13.00 |
| (C) | Terephthalic Acid | 996 | 6.000 | 12.00 |
|   | OH/COOH = 2.25 | | | |

The same equipment and procedure as outlined in Example 1(a) were employed in preparing this polymer. It was reacted until the melt was clear and 196 mls of distillate had been collected. The molten resin was dropped into a pan and allowed to harden.

b. Preparation of Aqueous Wire Enamel

Using the same equipment and procedure as described in Example 1(b) an aqueous enamel was prepared by compounding 500 grams of base polymer 5(a) with 50 grams each of NMP and DMEA, 200 grams distilled water and 18.75 grams Tyzor TE having the following solution properties:

Viscosity: O
% Solids: 62.9
pH: 7-8
% Cosolvent: 20

To demonstrate the effect of a monofunctional reactant, such as a glycol ether, in completely eliminating the need of any cosolvent to effect good aqueous solubility, the following Examples 6-8 are offered as evidence.

EXAMPLE 6 a. Preparation of Polymer

|   | Reactants | Wt. Grams | Mols | Equivalents |
|---|---|---|---|---|
| (A) | Ethylene Glycol | 305 | 4.914 | 9.828 |
| (B) | THEIC | 1233 | 4.725 | 14.175 |
| (C) | Terephthalic Acid | 966 | 6.000 | 12.000 |
| (D) | Methyl Ether of Diethylene Glycol | 131 | 1.092 | 1.092 |
|   | OH/COOH = 2.09/1 | | | |

The same equipment and procedure as outlined in Example 1(a) were employed in preparing this polymer. It was reacted until the melt was clear and 206 mls of distillate had been collected.

b. Preparation of Aqueous Wire Enamel

Using the same equipment and procedure as described in Example 1(b) an aqueous wire enamel was prepared by compounding 500 grams of base polymer 6(a) with 50 grams DMEA, 200 grams distilled water and 18.75 grams Tyzor TE. This is the first example of an aqueous enamel that is clear and not requiring any cosolvent. It had a viscosity of V, a solids content of 67%, and a pH of 7-8.

EXAMPLE 7 a. Preparation of Polymer

|   | Reactants | Wt. Grams | Mols | Equivalents |
|---|---|---|---|---|
| (A) | Ethylene Glycol | 271 | 4.368 | 8.732 |
| (B) | THEIC | 1233 | 4.725 | 14.175 |
| (C) | Terephthalic Acid | 966 | 6.000 | 12.000 |
| (D) | Methyl Ether of Diethylene Glycol | 262 | 2.184 | 2.184 |
|   | OH/COOH = 2.09/1 | | | |

The same equipment and procedure as described in Example 1(a) were employed in preparing this polymer. It was reacted until the melt was clear and 198 mls of distillate had been collected. The molten resin was dropped into a pan and allowed to harden.

b. Preparation of Aqueous Wire Enamel

Using the same equipment and procedure as described in Example 1(b) an aqueous enamel was prepared by blending 600 grams of base polymer 7(a) with 60 grams DMEA, 150 grams distilled water and 22.5 grams Tyzor TE with liquid properties as follows:

Viscosity: X ¾
% Solids: 74.2
pH: 7-8
% Cosolvent: 0

EXAMPLE 8 a. Preparation of Polymer

|   | Reactants | Wt. Grams | Mols | Equivalents |
|---|---|---|---|---|
| (A) | Ethylene Glycol | 305 | 4.914 | 9.828 |
| (B) | THEIC | 1233 | 4.725 | 14.175 |
| (C) | Terephthalic Acid | 996 | 6.000 | 12.000 |
| (D) | Phenyl Ether of Ethylene Glycol | 155 | 1.092 | 1.092 |
|   | OH/COOH = 2.09 | | | |

The same equipment and procedure as outlined in Example 1(a) were employed in preparing this polymer. It was reacted until the melt was clear, and the final acid number was 9.2 on the solids, a hydroxyl number of 312 and the distillate collected was 193 mls. The molten resin was dropped into a pan and allowed to harden.

b. Preparation of Aqueous Wire Enamel

Using the same equipment and procedure as described in Example 1(b) an aqueous enamel was prepared by blending 600 grams of base polymer 8(a) with 50 grams DMEA, 300 grams distilled water and 37 grams Tyzor TE with the following liquid properties:
Viscosity: X
% Solids: 63.8
pH: 7–8
% Cosolvent: 0

To demonstrate the effect of a certain critical excess hydroxyl content has an aqueous solubility the following polyesters vs Example 9 and their comparison data are presented in Table 1.

in cresylic acid, and the total distillate collected was 313 mls. The molten resin was dropped into a pan, and allowed to harden.

b. Preparation of Aqueous Wire Enamel

Using the same equipment and procedure as described in Example 1(b) 600 grams of base polymer 9(a) was blended with 70 grams NMP, 90 grams DMEA and 280 grams distilled water, but the solution was very cloudy. Another mix was prepared with the same material and amounts, save for the DMEA which was increased to 130 grams and the solution was again quite cloudy.

In Table 1 the relationship of average functionality (avg. f) and OH/COOH content or % excess OH to solubility is shown with the various polyester and aqueous wire enamel examples.

Table 1

| Polyester Example No. | 9(a) | 1(a) | 2(a) | 3(a) | 4(a) |
|---|---|---|---|---|---|
| OH/COOH Ratio | 1.48 | 1.83 | 2.00 | 2.09 | 2.44 |
| % Excess OH | 48.00 | 83.00 | 100.00 | 109.00 | 144.00 |
| Avg. f | 2.253 | 2.277 | 2.203 | 2.292 | 2.308 |
| Aqueous Wire Enamel Example No. | 9(b) | 1(b) | 2(b) | 3(b) | 4(b) |
| Solution Appearance | very cloudy | very sl. haze | clear | clear | clear |
| Viscosity | — | X¼ | V | U¼ | T |
| % Solids | 57.3 | 60.1 | 62.9 | 63.2 | 66.0 |
| pH | 7–8 | 7–8 | 7–8 | 7–8 | 7–8 |
| % Cosolvent | 20.0 | 20.0 | 20.0 | 20.0 | 20.0 |

EXAMPLE 9 a. Preparation of Polymer

| | Reactants | Wt. Grams | Mols | Equivalents |
|---|---|---|---|---|
| (A) | Ethylene Glycol | 395 | 6.37 | 12.74 |
| (B) | THEIC | 1438 | 5.51 | 16.53 |
| (C) | Terephthalic Acid | 1640 | 9.88 | 19.76 |
| | OH/COOH = 1.48/1 | | | |

The same equipment and procedure as described in Example 1(a) were employed in preparing this polymer. It was reacted to a final viscosity of X¼ at 30% solids As the results indicate, at a OH/COOH ratio of 1.48 the aqueous wire enamel was very cloudy and at 1.83 there was a distinct improvement with only a very slight haze. All the higher OH/COOH ratios provided clear aqueous solutions — indicating at 83% excess OH content and upward is needed to achieve clarity in a solvent blend composed of 80% water and 20% cosolvent.

The profound effect of a specific diol in an otherwise standard formulation on aqueous solubility is shown in Table 2. The polyesters were prepared with the same equipment and procedure as outlined in Example 1(a) and the aqueous wire enamels in the same manner as Example 1(b).

Table 2

"Effect of Diols on Aqueous Solubility"

| | Polyesters | | | | | | | |
|---|---|---|---|---|---|---|---|---|
| | Example 10(a) | | Example 11(a) | | Example 12(a) | | Example 13(a) | |
| | grams | mols | grams | mols | grams | mols | grams | mols |
| Terephthalic Acid | 1328 | 8 | 1328 | 8 | 830 | 5 | 830 | 5 |
| Glycerine (96%) | 512 | 5.336 | 512 | 5.336 | 378 | 3.94 | 378 | 3.94 |
| Ethylene Glycol | 496 | 8 | | | | | | |
| Neopentyl Glycol | | | 832 | 8 | | | | |
| Hydantoin Glycol (DHEDMH) | | | | | 855 | 4.55 | | |
| Hydroquinone Di-Hydroxyethyl Ether | | | | | | | 900 | 4.55 |
| avg. f | 2.25 | | 2.25 | | 2.292 | | 2.292 | |
| OH/COOH | 2.0 | | 2.0 | | 2.09 | | 2.09 | |
| Process Physicals | | | | | | | | |
| Viscosity at 60%NV in MCA* | G- | | J¾ | | — | | — | |
| Acid Number | 33.6 | | 22 | | 29.2 | | 24.4 | |

| | Example 10(b) | | Example 11(b) | Example 12(b) | | Example 13(b) |
|---|---|---|---|---|---|---|
| | grams | grams | grams | grams | grams | grams |
| Polyester | 600 | 600 | 600 | 600 | 600 | 600 |
| DMEA | 60 | 60 | 60 | 60 | 60 | 4.6 |
| NMP | 280 | — | 300 | 60 | — | — |
| Butoxyethanol | — | 350 | — | — | 60 | 360 |
| Water | 200 | 200 | 200 | 200 | 200 | 15.4 |
| Tyzor TE | — | — | — | 33.75 | 33.75 | — |
| Solution Properties | | | | | | |
| Appearance | cloudy | cloudy | cloudy | clear | clear | cloudy-2 phases |
| Viscosity | — | — | — | X | T | — |
| % Solids | 52.6 | 49.6 | 51.7 | 65.7 | 65.7 | 61.2 |

Table 2-continued
"Effect of Diols on Aqueous Solubility"

| % Cosolvent | 58.3 | 63.6 | 60.0 | 23.1 | 23.1 | 95.9 |
|---|---|---|---|---|---|---|

*Methyl Cellosolve Acetate

As the data indicates, only a hydantoin glycol-based polyester had reasonably good solubility in water having either NMP or butoxyethanol at a 23.1% level. All the other diols were cloudy at high cosolvent levels ranging from 58.3 to 95.9%. Thus, a polyester with hydantoin glycol and glycerine as a triol has solubility characteristics equal to Example 3(b) with ethylene glycol and THEIC.

Similarly, the type of triol employed in a specific polyester formulation greatly influences its aqueous solubility characteristics. Again, the polyesters and their respective aqueous wire enamels were prepared as outlined in Example 1(a) and Example 1(b). This information is summarized in Table 3.

To illustrate the excellent properties of these aqueous wire enamels, a few of the many examples were selected and their solvent-based counterparts using the same base polymer were compared propertywise. For details, consult Table 4.

The effect of titanate was studied with aqueous wire enamels prepared with the polymer of Example 3(a) and 3(b). These enamels had the following compositions:

|  | Example 3(b)[1] | Example 3(b)[2] | Example 3(b)[3] |
|---|---|---|---|
| Example 3(b) | 730 | 730 | 730 |
| Tyzor TE | 14.3 | 28.5 | 42.8 |
| Viscosity | V ½ | U ½ | U ½+ |
| % Tyzor TE | 2.5 | 5 | 7.5 |

Table 3
"Effect of Polyols on Aqueous Solubility"

| | Example 14 (a) | | Example 15 (a) | | Example 16 (a) | | Example 17 (a) | | Example 18 (a) | | Ex. 3 (a) Control | |
|---|---|---|---|---|---|---|---|---|---|---|---|---|
| | grams | mols | grams | mols | grams | mols | grams | mols | grams | mols | grams | mols |
| Terephthalic Acid | 1328 | 8 | 1328 | 8 | 1328 | 8 | 1328 | 8 | 996 | 6 | 1394 | 8.4 |
| Ethylene Glycol | 124 | 2 | 318 | 5.12 | 124 | 2 | 124 | 2 | 331 | 5.34 | 474 | 7.645 |
| Neopentyl Glycol | 483 | 4.64 | 483 | 4.64 | 483 | 4.64 | 483 | 4.64 | | | | |
| Glycerine (96%) | 598 | 6.24 | | | | | | | | | | |
| Mono-Pentaerythritol | | | 424 | 3.12 | | | | | | | | |
| Trimethylolethane | | | | | 749 | 6.24 | | | | | | |
| Trimethylolpropane | | | | | | | 836 | 6.24 | | | | |
| Niax Polyol LG 650 | | | | | | | | | 1190 | 4.44 | | |
| THEIC | | | | | | | | | | | 1726 | 6.613 |
| Avg. f | 2.299 | | 2.299 | | 2.299 | | 2.299 | | 2.281 | | 2.292 | |
| OH/COOH | 2.0 | | 2.0 | | 2.0 | | 2.0 | | 2.0 | | 2.09 | |

| | Example 14 (a) | Example 15 (a) | Example 16 (a) | Example 17 (a) | Example 18 (a) | Ex. 3 (a) Control |
|---|---|---|---|---|---|---|
| Process Physicals | | | | | | |
| Viscosity at 60% NV in MCA | H ½ | M | J | I ½ | — | O-P at 30% NV in CA #43 (cresylic acid) |
| Acid Number | 11.8 | 32 | 33 | 36 | 58 | — |

| | Example 14 (b) grams | Example 15 (b) grams | Example 16 (b) grams | Example 17 (b) grams | | Example 18 (b) grams | Ex. 3 (b) Control grams |
|---|---|---|---|---|---|---|---|
| Polyester | 500 | 600 | 600 | 600 | 600 | 600 | 1390 |
| DMEA | 65 | 60 | 60 | 60 | 60 | 60 | 139 |
| NMP | — | 160 | 210 | 260 | — | — | 139 |
| Butoxyethanol | — | — | — | — | 260 | 260 | — |
| Methyl Ether of Diethylene Glycol | 153 | — | — | — | — | 160 | — |
| Water | 112 | 250 | 200 | 200 | 200 | 200 | 556 |
| Tyzor TE | — | 33.75 | 33.75 | — | 33.75 | — | — |
| Solution Properties | | | | | | | |
| Appearance | v. cloudy | clear | clear | cloudy | clear | cloudy | clear |
| Viscosity | — | W− | U | — | L ½ | — | W |
| Solids (%) | 60.2 | 56.8 | 56.8 | 53.6 | 54.4 | 58.8 | 62.5 |
| Cosolvent (%) | 57.7 | 39 | 51.2 | 56.5 | 56.5 | 44.4 | 20 |

The triols listed in Table 3, save for THEIC, in the polyester compositions shown required cosolvent contents of 39% or higher to get clear aqueous solutions in some cases; in others they were still cloudy at levels up to 57.7%. Example 3(b) with THEIC in its composition exhibits its superior aqueous solubility at a cosolvent level of 20%.

As indicated in Table 5 at the 7.5% titanate level there was a slight decrease in cut-through temperature. The best values were obtained with the titanate content at 5%; otherwise the other wire properties were all quite comparable.

Table 4
Water-Based Enamels vs. Solvent-Based Enamels

| | Example 1(a) | | Ex. 3(a) | Example 4(a) | | Ex. 5(a) | Ex. 6(a) | Ex. 7(a) |
|---|---|---|---|---|---|---|---|---|
| | Aqueous Ex. 1(b) | Solvent Based | Aqueous Ex. 3(b) | Aqueous Ex. 4(b) | Solvent Based | Aqueous Ex. 5(b) | Aqueous Ex. 6(b) | Aqueous Ex. 7(b) |
| Wire Properties | | | | | | | | |

Table 4-continued

| | Water-Based Enamels vs. Solvent-Based Enamels | | | | | | | |
|---|---|---|---|---|---|---|---|---|
| | Example 1(a) | | Ex. 3(a) | Example 4(a) | | Ex. 5(a) | Ex. 6(a) | Ex. 7(a) |
| | Aqueous Ex. 1(b) | Solvent Based | Aqueous Ex. 3(b) | Aqueous Ex. 4(b) | Solvent Based | Aqueous Ex. 5(b) | Aqueous Ex. 6(b) | Aqueous Ex. 7(b) |
| on AWG #18 Copper Wire | | | | | | | | |
| Build in mils, basecoat | 2.0 | 2.3 | 2.0 | 2.0 | 2.3 | | 2.0 | 2.3 |
| topcoat | 0.9 | 0.7 | 1.0 | 0.9 | 0.7 | | 1.0 | 0.7 |
| Type of Topcoat | Nylon | Nylon | Nylon | Nylon | Nylon | Amide-Imide | Nylon | Amide-Imide |
| Speed, ft/min | 50 | 50 | 50 | 50 | 50 | 45 | 50 | 45 |
| Appear, basecoat | 3 | 2-3 | 3 | 3 | 3 | 3 | 3 | 3 |
| topcoat | 3 | 3 | 3 | 3 | 3 | 3 | 3 | 3 |
| Cut-Thru Temp., °C | 242 | 265 | 255 | 228 | | 280 | 240 | 278 |
| Heat Shocks, 20% prestretch | | | | | | | | |
| 1X | 40 | 90 | 70 | 80 | | 0 | 80 | 0 |
| 2X | 90 | 100 | 90 | 100 | | 10 | 100 | 20 |
| 3X | 100 | 100 | 100 | 100 | | 60 | 100 | 80 |
| 4X | 100 | 100 | 100 | 100 | | 80 | 100 | 90 |
| ½ hr at °C | 175 | 175 | 175 | 175 | Failed | 260 | 175 | 260 |
| Mandrel After Snap | 1X | 1X | 1X | 1X | Snap | 1X | 1X | |
| Burnout | | | 5.84 | | | | | |
| Abras., unilat. | | | 1800 | 1800 | | 2000 | 1400 | 1850 |
| | | | 1916 | 1933 | | 2000 | 1480 | 1950 |
| Elect.Str.,dry KV Tower Temp. at 900° F | | | 13.1 | | | | | |

Table 5

| | "Effect of Titanate Content on Wire Properties | | |
|---|---|---|---|
| Enamel Number | Example 3(b)[1] | Example 3(b)[2] | Example 3(b)[3] |
| Wire Properties, on AWG #18 Copper Wire | | | |
| Build in mils, basecoat | 2.0 | 2.0 | 2.0 |
| topcoat | 1.0 | 1.0 | 1.0 |
| Type of Topcoat | Nylon | Nylon | Nylon |
| Speed, ft/min | 50 | 50 | 50 |
| Appearance, basecoat | 3 | 3 | 2-3 |
| topcoat | 3 | 3 | 3 |
| Cut-Through, Temp. °C | 255 | 255 | 241 |
| Heat Shocks, 20% Prestretch, 1X | 0 | 70   0 | 80   50 |
| 2X | 80 | 90   80 | 90   90 |
| 3X | 100 | 100   100 | 100   100 |
| 4X | 100 | 100   100 | 100   100 |
| ½hr at °c | 175 | 175   200 | 175   200 |
| Mandrel After Snap | 1X | 1X | 1X |
| Abrasion, unilateral | 1125 | 1800 | 2000 |
| | 1691 | 1916 | 2000 |
| Burnout | 5.96 | 5.84 | 5.36 |
| Electric Strength, dry, KV Tower Temp. at 900° F | 12.2 | 13.1 | 11.1 |

The polyesters of the invention are thermosetting. Unless otherwise indicated, all parts and percentages are by weight.

What is claimed is:

1. A solution of a thermosetting polyester in water or water containing a water miscible polar solvent, said polar solvent being present in an amount up to 30%, said solution also containing an amine and an organic titanate which is hydrolytically stable as a curing agent for the polyester, said polyester having a molecular weight of 800 to 1300, an OH/COOH ratio of 1.8:1 to 3:1 and being prepared from reactants consisting essentially of (1) (a) an aromatic dicarboxylic acid with 0 to 50% based on the total dicarboxylic acid of a cycloaliphatic dicarboxylic acid,
(b) tris(2-hydroxyethyl)isocyanurate or an aliphatic polyhydric alcohol containing at least three hydroxyl groups,
(c) a primary dihydric alcohol,
(d) a monohydric alcohol, or (2) (a), (b) and (c), the molar ratio of (c) to (b) being from 75:25 to 40:60 when (d) is not present and the molar ratio of (c) plus (d) to (b) when (d) is present being 75:25 to 40:60.

2. A solution according to claim 1 wherein the amine is present in an amount to impart a pH of 7-9 to the solution.

3. A solution according to claim 2 wherein the amine is a tertiary amine.

4. A solution according to claim 1 wherein (b) is a triol.

5. A solution according to claim 4 wherein (a) is 100% aromatic dicarboxylic acid.

6. A solution according to claim 5 wherein (a) is terephthalic acid.

7. A solution according to claim 6 wherein (a) is free terephthalic acid.

8. A solution according to claim 6 wherein (b) is tris(2-hydroxyethyl)isocyanurate.

9. A solution according to claim 8 wherein (c) is ethylene glycol.

10. A solution according to claim 8 wherein the polyester is (2) and there is present 5 to 30% of the polar solvent.

11. A solution according to claim 10 wherein (c) is ethylene glycol and there is present 5 to 25% of the polar solvent.

12. A solution according to claim 8 wherein the polyester is (1).

13. A solution according to claim 12 wherein (d) is a lower alkoxy ethanol, a lower alkoxy ethoxyethanol, phenoxyethanol or phenoxyethoxyethanol.

14. A solution according to claim 12 wherein (d) is methoxyethoxy ethanol or phenoxyethanol.

15. A polyester according to claim 14 wherein (c) is ethylene glycol.

16. A solution according to claim 6 which is (1), (b) is an aliphatic polyhydric alcohol and (c) is 1,3-di(hydroxyethyl)-5,5-dimethyl hydantoin and there is present 10 to 30% of the polar solvent.

17. A solution according to claim 16 where (b) is glycerine.

18. A solution according to claim 1 wherein polyester has a functionality between 2.0 and 2.2.

19. An electrical conductor coated with the resin obtained by curing a thermosetting polyester which is soluble in water in the presence of an amine or in a mixture of water with up to 30% of a water miscible polar solvent in the presence of an amine, said polyester having a molecular weight of 800 to 1300, an OH/COOH ratio of 1.8:1 to 3:1 and being prepared from reactants consisting essentially of
  (1) (a) an aromatic dicarboxylic acid with 0 to 50% based on the total dicarboxylic acid of a cycloaliphatic dicarboxylic acid,
    (b) tris(2-hydroxyethyl)isocyanurate or an aliphatic polyhydric alcohol containing at least three hydroxyl groups,
    (c) a primary dihydric alcohol,
    (d) a monohydric alcohol, or
  (2) (a), (b) and (c), the molar ratio of (c) to (b) being from 75:25 to 40:60 when (d) is not present and the molar ratio of (c) plus (d) to (b) when (d) is present being 75:25 to 40:60.

20. A coated electrical conductor according to claim 19 which is a wire.

21. A process for the production of an insulating coating on an electrical conductor comprising coating the conductor by passing it through the aqueous composition of claim 1.

22. A coated electrical conductor prepared by the process of claim 21.

23. A coated conductor according to claim 22 wherein (b) is a triol.

24. A coated conductor according to claim 23 wherein (a) is 100% aromatic dicarboxylic acid.

25. A coated conductor according to claim 24 wherein (a) is terephthalic acid.

26. A coated conductor according to claim 25 wherein (a) is free terephthalic acid.

27. A coated conductor according to claim 25 wherein (b) is tris(2-hydroxyethyl)isocyanurate.

28. A coated conductor according to claim 27 wherein (c) is ethylene glycol.

29. A coated conductor according to claim 28 wherein the polyester is (2) and the solution employed has 5 to 30% polar solvent.

30. A coated conductor according to claim 29 wherein (c) is ethylene glycol.

31. A coated conductor according to claim 27 wherein the polyester is (1).

32. A coated conductor according to claim 31 wherein (d) is a lower alkoxy ethanol, a lower alkoxy ethoxyethanol, phenoxyethanol or phenoxyethoxyethanol.

33. A coated conductor according to claim 31 wherein (d) is methoxyethoxy ethanol or phenoxyethanol.

34. A coated conductor according to claim 33 wherein (c) is ethylene glycol.

35. A coated conductor according to claim 25 which is (1), (b) is an aliphatic polyhydric alcohol and (c) is 1,3-di(hydroxyethyl)-5,5-dimethyl hydantoin and the solution employed has 10 to 30% of the polar solvent.

36. A coated conductor according to claim 35 where (b) is glycerine.

* * * * *